United States Patent Office 3,320,861
Patented May 23, 1967

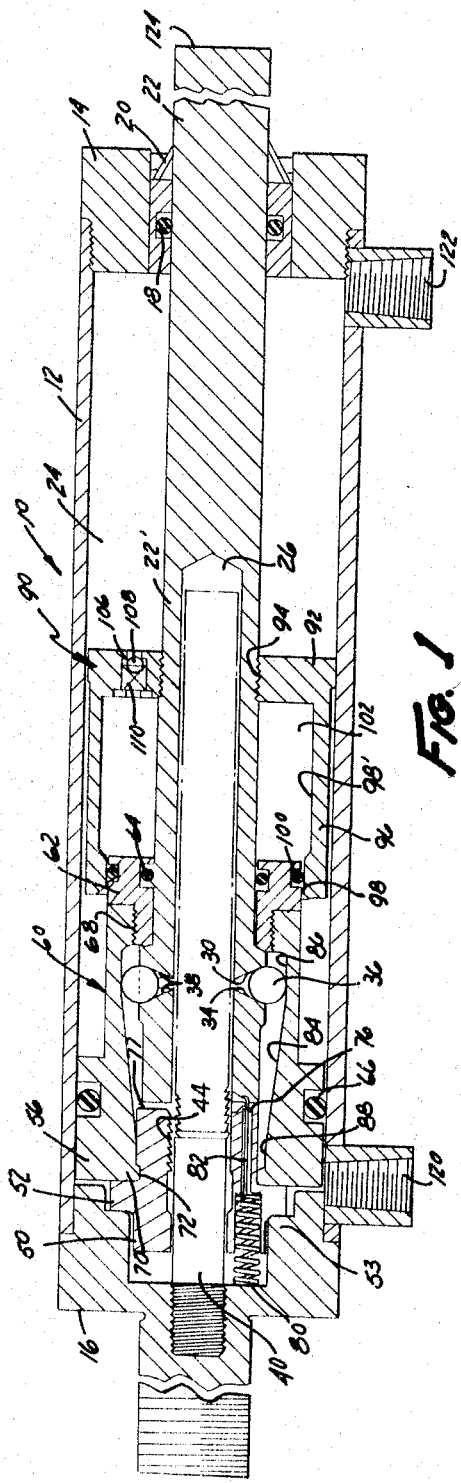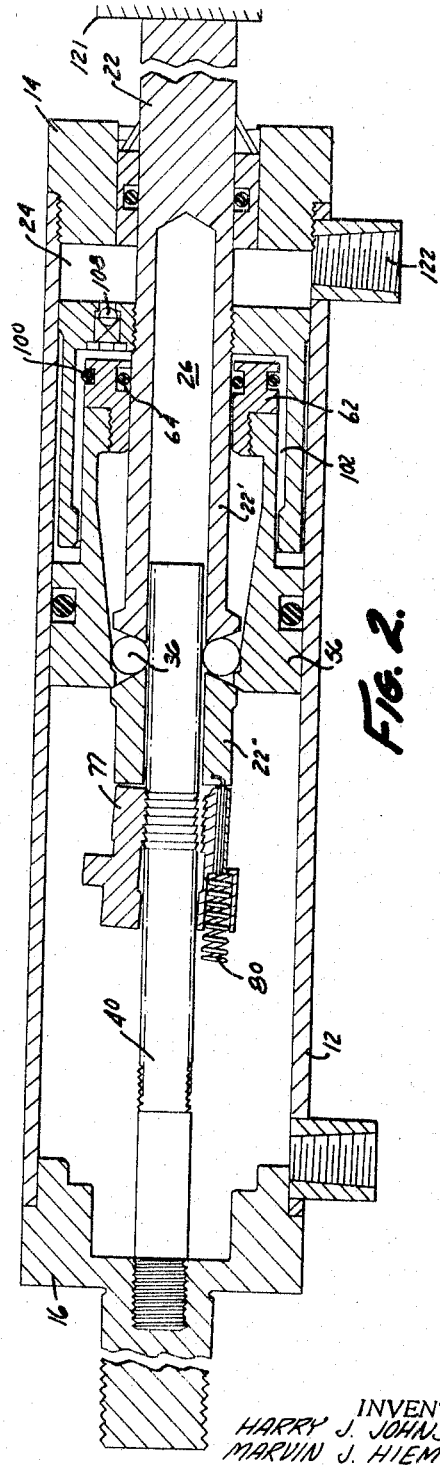

3,320,861
LOCKING FLUID CYLINDER
Harry J. Johnson, Kalamazoo, and Marvin J. Hiemstra, Grand Rapids, Mich., assignors to Mechanical Power Corporation, Grandville, Mich., a corporation of Michigan
Filed Dec. 22, 1965, Ser. No. 515,656
6 Claims. (Cl. 92—14)

This invention relates to a fluid cylinder, and more particularly to a locking fluid cylinder that employs power stroke amplification means, and has a unique fluid restraining means controlling the initial applied pressure necessary to cause actuation of the pressure amplification mechanism.

Fluid cylinders having locking means and mechanical power amplification means have been developed heretofore, as in Reissue Patent 25,334 and Patents 3,135,171 and 3,160,078. With these devices, after the extended cylinder shaft strikes an object and stops, the internal piston assembly continues to shift under fluid pressure along the stationary shaft to mechanically apply an amplification force to the shaft to extend it a tiny amount at a great pressure. Preferably, this is done by slight axial expansion of the shaft. Locking means behind the shaft prevents the shaft from moving rearwardly during this expansion.

Since axial movement of the shaft during pressure amplification is very small, if the outer end of the shaft is not initially pressed tightly against the object prior to amplification, the small shaft expansion will merely be wasted. Hence, the initial major shaft movement under normal cylinder pressures must be complete, for the mechanism to be totally effective. The object contacted must be tightly pressed prior to pressure amplification.

A typical example involves the welding of two metal sheets together. These must first be tightly pressed together prior to application of the force amplification. Since this normally requires slight flexing of the sheets to press them tightly together, the power amplification shift with shaft expansion will only flex the sheet slightly more and will not apply the greatly increased pressure to the two sheets.

Previously, a mechanical detent, such as spring-biased ball received in a groove, was mounted between the shaft and piston assembly to require an extra force to be applied to the piston before it released from the shaft. However, mechanical detents are difficult to preset for continued release at the same pressure, especially after several thousand strokes of the mechanism. The parts by nature wear at the corners, for example at the edges of the ball-receiving recess, causing the pressure necessary for release of the piston assembly from the shaft to constantly diminish. Also, the spring biasing the detent mechanism tends to become weakened after several thousand strokes, to thereby lessen the pressure necessary to release the piston assembly. Thus, with mechanical releasing mechanisms, wear is of major concern, since it tends to limit the useful life of the cylinder assembly.

It is an object of this invention to provide in a fluid cylinder of the type having a piston assembly releasable from the shaft upon shaft impact with an object, a unique fluid restraining cushion between the piston assembly and the shaft for control of the release of the piston from the shaft. The fluid restrainer acts as a brake, and temporarily prevents premature release of the piston assembly from the shaft.

Another object of this invention is to provide, in a cylinder of the type having a piston releasable from the shaft, a fluid cushion which instantly applies a resistance to release, and, after a predetermined pressure is applied, allows complete release by venting the fluid in the cushion to enable complete piston assembly movement.

Another object of this invention is to provide, in a power amplification cylinder of the type having a piston assembly that shifts with respect to the shaft, and includes shaft expander means, a fluid restrainer braking cushion that exactly, dependably, and repeatedly controls the release of the shaft expander means to the piston assembly from the shaft, for movement therealong. The fluid restrainer effects this controlled release in a reliable fashion, at a constant force, even after thousands of cylinder strokes. It maintains a substantially constant predetermined release pressure over the lifetime of the cylinder. Wear on the components of the braking cushion is practically nil, causing it to have a long useful life so as not to constitute a weak spot of the assembly. Regulation of the release pressure can moreover be controlled during manufacture, and can be varied merely by changing one dimension of one component. The fluid pressure release of the cushion is complete, when occurring, to cause unhindered and unrestrained movement of the piston assembly in its power amplification stroke. Moreover, return of the piston assembly is complete and rapid upon application of reverse fluid pressure in the cylinder. Both the forward and reverse strokes can be extremely rapid, so that controlled stroke and power amplification is achieved without sacrificing operational time.

These and several other objects of this invention will become apparent upon studying the following specification in conjunction with the drawings, in which:

FIG. 1 is a sectional, elevational view of the cylinder assembly in its retracted condition; and FIG. 2 is a sectional, elevational view of the assembly as extended and locked in the power amplification stroke.

Referring now specifically to the drawings, the complete cylinder assembly 10 includes cylindrical, elongated housing 12 having end closure means such as orificed end cap 14 and closed end cap 16. The orificed end cap includes a central, axially aligned opening with appropriate seals 18 and 20 annularly arranged around the extended end shaft 22 which protrudes from the body of the cylinder out the end. Shaft 22 extends, when retracted, generally along a major share of the length of the cylinder for maximum usage of cylinder chamber 24. Its rear or inner end is hollow to form the axially aligned, generally cylindrical central cavty 26. The complete end shaft includes the major portion 22' that extends on one end through one end cap, and has on its inner end a tapered annular end face 30. The shaft also includes an extension portion 22" axially aligned with, adjacent to, and spaced slightly from the inner end face of portion 22'. It also has an annular tapered face 34 adjacent and facing tapered face 30. These two tapered faces provide an annular groove having a generally V-shaped cross section, convergent radially inwardly toward the axis of the assembly. Positioned between the two faces around the periphery is a plurality of expander, rolling ball elements 36. The V-shaped grooves between faces 30 and 34 are preferably divided into several, spaced, small V-shaped pockets for the individual balls by having intermediate radially extending shoulders 38 between the pockets and axially on the two end faces 30 and 34.

Threadably secured at one of its ends into the inner face of end cap 16 is a serrated, axially extending, centrally positioned anchor rod 40. It remains fixed in the central portion of the cylinder assembly at all times. It extends through the central passage of the annular, sleeve-type shaft extension 22", and into the dead end, central cavity 26 in the rear end of centrally located shaft portion 22'. Peripheral serrations are provided on this rod to cooperate with serrations 44 on the inner circumferce at one peripheral portion of an annular tiltable ping lock ring or nut 50. This lock ring is axially gned with the shaft and cylinder, and is located im- ediatly behind shaft portion 22″. It includes a radi- y outwardly extending peripheral shoulder 52 that uts against a cooperative shoulder 53 of end cap 16 to nit movement of the lock ring in one direction. The ial opening through the center of the lock nut received d 40. It has a diameter larger than rod 40, to enable it move along the serrated rod with clearance. It is rmally retained out of contact with the serrated rod. le interfit of this lock nut with the surrounding annu- r sleeve 56 prevents it from moving radially any con- lerable amount. Only when the lock nut disengages om sleeve 56 can it engage with the serrated rod by pping downwardly to a skewed position illustrated in G. 2. In this position, it is askewed with respect to the is of the remaining components of the assembly. It is a single contact nose 76 that projects axially for- ardly of the ring on one side of the axis, to abut the ar end face of portion 22″. An axial clearance 77 is tween the parts opposite the fulcrum. This nose con- ct can act as a fulcrum to cause tipping of the nut when eve 56 is removed from contact with the nut. The rear it axial annular face of sleeve 56 normally prevents the it from tilting due to continuous balanced contact with ripheral nut shoulder 52.

Sleeve 56 is actually part of the entire piston assembly ) which surrounds shaft 22 and expander balls 36. The rward ring 62 of the sleeve is sealed by a typical -ring 64 to the outer peripheral surface of shaft 22 hen sliding therealong. Another outer O-ring 66 around e rear end of sleeve 56 forms a sliding seal with the ner peripheral wall of cylinder housing 12. The trail- ig sleeve portion 56 is attached to forward ring 62 by reads 68.

Sleeve 56 includes a tipping finger 70 extending radi- ly inwardly at the rear of the sleeve, and fitting within cooperative recess 72 in the tip nut on the side of the p nut adjacent serrations 44 and opposite fulcrum nose 6. When finger 70 pulls the tip nut forwardly, the nut ill pivot on fulcrum 76 and cause serrations 44 to en- age with serrated rod 40.

The tip nut also includes an axial passage that retains coil spring 80 therein. This coil spring projects from he rear of the tip nut to act as a compression spring butment to cushion the abutment of the tip nut with nd cap 16. It also includes a forwardly extending ten- on wire 82 that attaches to the rear end of shaft exten- on 22′ to maintain these elements in constant abutment t fulcrum 76.

The trailing annular sleeve portion 56 of the piston ssembly 60 has an inner, tapered, shaft expander actua- or surface 84. This annular surface is tapered radially wardly toward its rearmost portion, so that, when it is pulled over the ball elements 36, the tapered surface ill cam the balls radially inwardly toward the axis of he assembly between tapered end faces 30 and 34 to xpand the shaft axially a slight amount. This move- nent obtains a large mechanical advantage, to multiply he pressure initially applied by the shaft. At the front f the camming tapered surface 84, is a generally flat ylindrical surface 86 having no camming action and eing the largest portion of the camming mechanism. This allows a camming action to be applied only with pecial sleeve movement. At the rear is a second gen- rally cylindrical flat surface 88 to accommodate the end f the camming stroke. This surface allows stability of he assembly after pressure stroke amplification by pre- venting reverse pressure on the shaft through the balls o cause a reversing force on the piston assembly. Thus, he pressure applied to the shaft merely exerts a direct adially outward pressure on the sleeve by the balls, with io axial force component.

Uniquely associated with piston assembly 60 is a novel fluid cushion mechanism 90. This mechanism actually forms a second cylinder, inside the main cylinder assem- bly. It is an annular element generally U-shaped in cross sectional configuration. The bottom of the U is an end 92 affixed to the shaft by threads 94. The rest of the element is a rearwardly extending cylindrical sleeve 96 spaced from shaft portion 22′ and terminating in a radially inwardly extending, cylindrical shoulder 98 at its rear end. Between shoulder 98 and shaft 22 is an annu- lar opening to the rear which receives the forward nose ring 62 of sleeve 56. This nose portion has a second annular, outer diameter sliding O-ring seal 100 sealing against shoulder 98. Thus O-rings 64 and 100 coopera- tively seal nose ring 62 of the sleeve forward end be- tween shaft portion 22′ and fluid cushion cylinder shoul- der 98. As long as the piston and sleeve assembly re- mains in this sealed relationship, a closed gaseous cushion chamber 102 is formed between nose 62 of the piston assembly on the axial rear, annular sleeve 96 of the smaller cylinder on the outer periphery, annular front end 92 on the axial front end, and the outer periphery of shaft 22 on the inner chamber periphery.

In end 92 is a check valve which includes a ball valve 106 closing off passageway 108 under the bias of a com- pression spring 110. The passage extends forwardly from cushion chamber 102 to the forward portion of cylinder chamber 24. The valve allows gaseous flow under pres- sure from main cylinder chamber 24 to cushion cylinder chamber 102, but prevents flow in the reverse direction from fluid cushion chamber 102 to main chamber 24.

Adjacent sealing shoulder 98 at the rear of fluid cushion cylinder 90 is a larger diameter inner peripheral wall 98′ which has a clearance from and does not seal against O-ring 100 when nose 62 of the cylinder assembly is projected further into the cushion than shoulder 98. The trailing parts of the camming sleeve 56 do not seal against shoulder 98 either. Thus, gaseous fluid in cham- ber 102 can escape between the piston assembly and the shoulder when nose 62 is inserted into cushion sleeve 96 past shoulder 98, to allow the piston assembly to con- tinue to move directly into chamber 102 while pushing the gas out the rear thereof, to a final, fully inserted position illustrated in FIG. 2.

*Operation*

In operation of the mechanism, pressurized fluid such as air is first introduced through inlet passage 120 on the rear end of the cylinder for forward shifting of the as- sembly. The mechanism is reversed by introduction of pressurized fluid into passage 122 on the opposite for- ward end of the cylinder adjacent orificed end cap 14. The cylinder is initially oriented so that front face 124 of shaft 22, or an end attachment thereon, will contact and press against the object to be acted upon. The cylin- der is rigidly mounted as by attaching the threaded outer end of the rear end cap 16 in a suitable socket. Pressur- ized fluid line connections are made to alternate inlet and exhaust ports 120 and 122, using typical valving and pressure mechanisms.

Initially, pressurized fluid is injected into port 120 and allowed to exhaust from port 122. Fluid through port 120 will axially move the entire assembly except for the cylinder housing with its end caps, and the fixed serrated rod 40. This movement will be from the rear or left end of the cylinder, as viewed, to the forward right end. More specifically, air pressure shifts lock nut 50, the piston as- sembly, including sleeve 56 and nose 62, and the shaft assembly including extension 22″, expander balls 36, and major shaft portion 22′. As the shaft moves, it carries its fluid cushion cylinder 90 along with it to maintain a constant sealed relationship between shoulder 98 of this cushion cylinder, nose 62, and the periphery of shaft 22, using O-rings 64 and 100. The entire assembly moves as a unit along serrated rod 40 and within the peripheral wall of housing 12, to extend end 124 of shaft 22 further and further out of the housing. As soon as the shaft contacts an external object 121, the mechanism reacts in a different fashion.

More specifically, fluid pressure through port 120 will continue to apply a pressure to lock nut 50 and sleeve 56 to apply a pressure through shaft extension 22″ and balls 36 to the shaft. This occurs because, even though cylinder assembly 90 tends to stop with the shaft, nose 62 creates a pressure in fluid cushion chamber 102 to prevent the entire camming sleeve mechanism from initially sliding with respect to the shaft. Thus, even though the piston assembly and its camming sleeve moves initially slightly with respect to the shaft, it creates this high pressure cushion in chamber 102 to assure full forward movement of shaft 22 against the object pressed, prior to release of the piston assembly from the shaft to cause the power amplification stroke. It will be realized that this power amplification stroke will only cause a very slight movement of shaft 22, and therefore, should not be wasted by taking up slack against the object. After the shaft is forced tightly against the object, and pressure continues to be applied through port 120 on the mechanism, sleeve 56 of the piston assembly will continue to move inwardly into cylinder 90, so that O-ring 100 moves off shoulder 98 against which it seals. When it moves adjacent the larger diameter portion 98′, fluid in chamber 102 is vented between the piston and shoulder 98 to allow release of this cushion. The piston assembly continues to move forwardly with respect to the shaft into chamber 102, to pull the camming surface 84 over balls 36. This forces them radially inwardly. This radial movement of the balls shifts the tapered surfaces 30 and 34 further apart to expand shaft 22. Rearward movement of shaft portion 22″ is prevented since finger 70 on advancing sleeve 56 has in the meantime pulled tip nut 50 to its tilted skewed position about fulcrum 76, so that serrations 44 are moved into engagement with the periphery of serrated rod 40. It locks shaft extension 22″ against rearward movement. Thus, radial inward movement of balls 36 causes forward movement of major extension 22′ to apply an amplified pressure having a force many times greater than the initial pressure applied by the shaft. The particular ratio of pressure increase can of course be controlled by the taper and length of surface 84.

When sleeve 56 moves its full extent, so that balls 36 are against annular surface 88 as shown in FIG. 2, the complete stroke with its full amplified pressure is applied. The actual operation of this takes place in a tiny fraction of a second.

By controlling the length of sealing shoulder 98, the particular initial pressure desired to be applied to the object prior to release of the piston assembly for power amplification can be varied. This is because it will necessitate the piston assembly 60 moving further or less into sealed cushion chamber 102, to thereby apply a greater or lesser pressure on the shaft, prior to release of the fluid in this chamber when O-ring 100 finally moves past shoulder 98. Thus, by merely changing this dimension in initial manufacture, for example, the exact characteristics of the applied pressure can be determined prior to amplification force actuation.

To reverse the mechanism, pressurized fluid is injected into forward port 122 and exhausted from port 120. The pressurized gas in chamber 24 passes through passage 108 around check valve 106 by shifting it against its small spring bias, to shift nose 62 rearwardly. The entire piston assembly shifts rearwardly to reverse the camming action and release the power stroke, even though only normal reverse pressure is applied. As soon as the rear annular face of sleeve 56 reaches shoulder 52 of the lock nut, it tilts the lock nut back to its axially aligned relation, so that serrations 44 disengage from rod 40 and allow the lock nut to shift rearwardly with the rest of the assembly.

It then returns to the original position shown in FIG. 1, ready for the next stroke.

Conceivably, the novel fluid cushion connection means between the shaft and the piston assembly could be employed only in combination with the tilting locking nut and without the pressure amplification apparatus. In that instance, locking would not occur until a pressure were applied by the piston assembly on the fluid cushion sufficient to vent the cushion by advancing the sleeve nose into the cushion chamber. The sleeve would not cause a camming action, but would only be part of the fluid cushion, and would actuate the locking nut.

Certain additional advantages to those specifically recited will probably occur to those in this art upon studying the foregoing form of the invention. The obvious minimal wear characteristics greatly extend the useful life of the mechanism. The components all cooperate uniquely and rapidly to achieve tremendous pressure output from the cylinder even though it is of relatively small size. Certain obvious changes in the structural details of the components are possible within the unique concept presented. Thus, the invention is not to be limited to the particular preferred form of the invention shown and described as illustrative of the unique concept, but should only be limited by the scope of the appended claims and the reasonable equivalent to those defined therein.

We claim:

1. A fluid cylinder assembly, comprising a cylinder housing having end closure means and fluid porting means to opposite ends of said cylinder; a fluid responsive piston means in said housing, and a shaft operably associated with said piston means and extending through an end closure to be operative on an external object; pressure amplification means operable on said shaft to shift it slightly further at an amplified pressure output, after said piston means has shifted it into abutment with an external object; fluid cushion restrainer means preventing actuation of said amplification means until a predetermined pressure is applied to said shaft by said piston means acting under applied fluid pressure, and said fluid cushion restrainer means including fluid venting means operable only upon the occurrence of said predetermined pressure to release said cushion restrainer means and allow actuation of said pressure amplification means.

2. A fluid cylinder assembly comprising: a cylinder housing having end closure means and fluid porting means to opposite ends of said cylinder; a fluid responsive piston assembly in said housing; a shaft operably engaged with said piston assembly and extending through an end closure to be operative on an external object; locking means operative by said piston assembly to lock said shaft against reverse movement by reverse force applied to the shaft; fluid cushion connecting means between said shaft and said piston assembly, forming a closed fluid chamber therebetween, normally allowing advancing movement of said piston assembly with said shaft and preventing movement of said piston assembly with respect to said shaft until a predetermined force is applied from said piston assembly to said shaft through said cushion; and fluid release venting means associated with said fluid cushion, operable upon the occurrence of said predetermined force to vent said cushion; said cushion, when vented, releasing said connection to enable piston assembly movement with respect to said shaft.

3. The fluid cylinder assembly in claim 1 wherein: said fluid restrainer means is between said piston means and said shaft, preventing movement of said piston means with respect to said shaft and thus preventing actuation of said amplification means until a predetermined pressure is applied to said shaft by said piston means acting under applied fluid pressure; said fluid restrainer means including a housing attached to said shaft and around it, forming a chamber having a rearwardly facing mouth, said piston means including a forwardly projecting nose lingly received in said mouth; advancement of said nose predetermined amount into said chamber releasing the sealed relation of said nose to said mouth, allowing venting of said chamber to release the cushion for movement of said piston means along said shaft; and said nose advancement occurring only upon the occurrence of said predetermined pressure, to thereby release said restrainer means and allow actuation of said pressure amplification means.

4. The fluid cylinder assembly in claim 2 wherein: said shaft has two aligned separate portions shiftable toward and away from each other to expand and contract said shaft axially, one end portion extending through said end closure to be operative on an external object; shaft spreading means operable on said shaft to expand it and shift said one portion slightly further at an amplified pressure output, after said piston means has shifted it into abutment with an external object; said piston means including camming element to shift said spreading means with movement of said piston means independently of said shaft; said fluid cushion means being between said camming element and said shaft causing simultaneous movement thereof until a predetermined pressure is applied to said shaft by said piston means acting under applied fluid pressure; said camming element being shiftable into said fluid cushion means upon the occurrence of said predetermined pressure, creating a vent from said cushion means for continued advancement of said camming element into said cushion and shifting of said shaft spreading means for pressure amplification.

5. The fluid cylinder assembly in claim 1 wherein: said shaft is axially expandable to amplify pressure applied by said shaft to an external object; means to lock said shaft against reverse movement during shaft expansion; said piston means including shaft expander means shiftable by pressurized fluid with said shaft toward said end closure through which said shaft extends; said expander means being shiftable along said shaft to axially expand it with mechanical advantage when allowed to move independently of said shaft; said fluid restrainer means being between said shaft and piston means, creating an initial restraining force on said shaft expander means, preventing movement thereof with respect to the shaft until a predetermined force is applied by said piston means to said shaft, and said cushion restrainer means being automatically releasable by venting thereof upon the application of said predetermined force, to allow shifting of said shaft expander means along said shaft.

6. The fluid cylinder assembly in claim 1 wherein: said shaft has one end operably associated with said piston assembly, and has a second end extending out said one end closure to be operative on an external object; a serrated rod fixed on one of its ends to the second end closure, and extending axially into said cylinder; said one shaft end being hollow and receiving said rod with clearance to be shiftable axially thereover; said shaft having a main portion, and an axially aligned separate annular portion adjacent its inner one end; said shaft portions having tapered, radially inwardly convergent end faces therebetween; a plurality of rolling expander elements between said tapered faces, to be shiftable radially inwardly to axially expand said shaft; a tiltable lock ring around said rod, having inner serrations on one side to engage said rod, but normally being out of engagement therewith; said lock ring being tiltable to engage and lock on said rod, and being engaged with the rear end of said shaft sleeve portion to prevent reverse shifting of said shaft when engaged with said rod; said ring having a projection nose on one side, engaging said shaft sleeve portion on one side to provide a tilting fulcrum; said piston means including portions sealing to said shaft and portions sealing to said housing, and being annular and shiftable axially with said shaft when the shaft is moving, and shiftable axially along said shaft with respect thereto when said shaft has stopped due to abutment with an external object; said piston means including an engagement with said lock ring opposite said fulcrum to tilt it and then disengage therefrom when said piston means is moved with respect to said shaft; said piston means including a camming sleeve with an elongated, radially tapered surface contacting said shaft expander elements and movable thereacross to cammingly shift said elements radially inwardly to expand said shaft axially when said piston assembly is moved with respect to said shaft; said fluid cushion restraining means operable on said piston assembly to restrain its movement with respect to said shaft until a predetermined pressure is applied by said piston assembly to said shaft and thus to said object, while the piston assembly is operated by normal fluid pressure in said cylinder; said restraining means including a cylinder surrounding said shaft, having a forward end attached to said shaft, and having an annular axial mouth receiving a forward portion of said camming sleeve to form a pressurized fluid cushion chamber therebetween; said forward portion being movable into said cushion chamber when said predetermined pressure is overcome; said movement releasing the seal between said forward camming sleeve portion and said surrounding cylinder to vent said cushion and allow movement of said piston assembly along said shaft for shaft expansion; and one way check valve means in said cushion cylinder unresponsive to pressure in said cushion cylinder, and responsive to pressure in said fluid cylinder adjacent said one end closure, to cause reverse movement of said camming sleeve out of said cushion chamber for releasing the shaft expander elements and cause reverse of the entire piston assembly.

References Cited by the Applicant
UNITED STATES PATENTS

Re. 25,334   2/1963   Michalak.
3,135,171   6/1964   Michalak.
3,160,078   12/1964   Hiemstra et al.

MARTIN P. SCHWADRON, *Primary Examiner.*

I. C. COHEN, *Assistant Examiner.*